United States Patent
Kawachiya et al.

(10) Patent No.: US 7,337,298 B2
(45) Date of Patent: Feb. 26, 2008

(54) EFFICIENT CLASS MEMORY MANAGEMENT

(75) Inventors: Kiyokuni Kawachiya, Yokohama (JP); Kazunori Ogata, Fujisawa (JP); Tamiya Onodera, Ageo (JP); Trent A. Gray-Donald, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 11/244,905

(22) Filed: Oct. 5, 2005

(65) Prior Publication Data

US 2007/0078916 A1 Apr. 5, 2007

(51) Int. Cl.
*G06F 12/00* (2006.01)
(52) U.S. Cl. .................................... 711/170
(58) Field of Classification Search ............... None
See application file for complete search history.

(56) References Cited

U.S. PATENT DOCUMENTS

| | | | |
|---|---|---|---|
| 6,144,994 A * | 11/2000 | Mizera et al. ............... 709/212 |
| 6,643,753 B2 * | 11/2003 | Avner et al. ................. 711/170 |
| 7,076,629 B2 * | 7/2006 | Bonola ........................ 711/170 |
| 7,146,479 B2 * | 12/2006 | Li et al. ....................... 711/170 |
| 2002/0099918 A1 * | 7/2002 | Avner et al. ................. 711/170 |
| 2003/0028739 A1 * | 2/2003 | Li et al. ....................... 711/170 |
| 2003/0120885 A1 * | 6/2003 | Bonola ........................ 711/170 |

* cited by examiner

*Primary Examiner*—Kevin Verbrugge
(74) *Attorney, Agent, or Firm*—Vazken Alexanian

(57) ABSTRACT

Memory segments are allocated for a classloader to store class information, such as by selecting an allocation approach based on classloader type. In a first approach, in response to each request, a segment having a fixed size is allocated. In a second approach, in response to a first request, a first segment having a size equal to an amount of memory needed to store information related to the request is allocated. In response to a second request, a second segment having a second size is allocated, and in response to a third request, a third segment having a third size greater than the second size is allocated. In a third approach, in response to the first request, a first segment having a first size is allocated. In response to a second request, a second segment having a second size greater than the first size is allocated.

20 Claims, 4 Drawing Sheets

EFFICIENT CLASS MEMORY MANAGEMENT

FIELD OF THE INVENTION

The present invention relates generally to class memory, in which memory segments are allocated for a classloader to store information for classes loaded by the classloader, and more particularly to managing such class memory.

BACKGROUND OF THE INVENTION

A class, in object-oriented programming (OOP) technology, is a user-defined data type that defines a collection of objects that share the same characteristics. An object, or class member, is one instance of the class. Concrete classes are designed to be instantiated. Abstract classes are designed to pass on characteristics through inheritance.

Classes can be used in conjunction with virtual machines, where a virtual machine here means an execution environment for a programming language. For instance, a Java® virtual machine (JVM) is software that converts Java® intermediate language code (bytecode) into machine language and executes it. A JVM is commonly installed in a web server to execute server-side Java® programs, and can also be installed in a client machine to run stand-alone Java® applications.

A classloader is software that executes as part of a virtual machine. A classloader finds a class file defining a class and that is stored on non-volatile storage like a hard disk drive, reads it into memory, and tells the virtual machine to treat the memory image of the class as legitimate bytecode. In loading a class or classes, a classloader thus needs memory to store information for the class or classes loaded.

Therefore, memory segments are allocated for each classloader, in which the information for the classes loaded by a given classloader is stored. A first memory segment is allocated for a given classlbader within the prior art that has a fixed size, regardless of the information to be stored in that memory segment by the classloader. If there is insufficient room within the memory segment to store all the information, another segment of the same fixed size is allocated within the prior art. This approach allows for fast unloading of classes later. Unloading occurs on a per-classloader basis in some types of virtual machines, such as the JVM, such that the memory allocated to a classloader can be quickly freed by deallocating the memory segments allocated to the classloader.

However, in some types of VM environments, such as some types of JVM environments, many classloaders are created. This results in significant waste of memory resources, since much of the memory allocated to the classloaders is not actually used to store class information. That is, memory allocated but not used wastes memory resources.

FIG. 1 shows an example of class memory management in accordance with the fixed-size strategy of the prior art. For a first classloader, a memory segment 102A is initially allocated having a fixed size corresponding to the width of the memory segment 102A in FIG. 1, such as 128 kilobytes (KB). Class information 104A is first stored by the first classloader within the memory segment 102A. Thereafter, class information 104B, 104C, and 104D are successively stored by the first classloader within the memory segment 102A. The sizes of the class information 104A, 104B, 104C, and 104D are proportional to their width relative to the width of the memory segment 102A itself. The portion of the memory segment 102A that remains free is the unused portion 106A, and has a size proportional to its width relative to the width of the memory segment 102A itself.

The next class information to be stored by the first classloader is the class information 104E. However, the class information 104E is greater in size than the unused portion 106A of the memory segment 102A. That is, as shown in FIG. 1, the width of class information 104E is wider than the width of the unused portion 106A. Therefore, another memory segment 102B is allocated to the first classloader, and which has a fixed size that is equal to the fixed size of the memory segment 102A. Thus, the widths of the memory segments 102A and 102B are the same.

The class information 104E is then stored in the memory segment 104B. Thereafter, class information 104F, 104G, 104H, and 104I are successively stored by the first classloader within the memory segment 102B since their sizes are larger than 106A. The sizes of the class information 104E, 104F, 104G, 104H, and 104I are proportional to their widths relative to the width of the memory segment 102B itself. The portion of the memory segment 102B that remains free is the unused portion 106B, and has a size proportional to its width relative to the width of the memory segment 102B itself.

The final class information to be stored by the first classloader is the class information 104J and the class information 104K. However, the class information 104J is greater in size than the unused portion 106B of the memory segment 102B and 106A of 102A. That is, as shown in FIG. 1, the width of the class information 104J is wider than the width of the unused portions 106B and 106A. Therefore, another memory segment 102C is allocated to the first classloader, and which has a fixed size that is equal to the fixed size of the memory segments 102A and 102B. Thus, the widths of the memory segments 102A, 102B, and 102C are the same.

The class information 104J is then stored in the memory segment 102C, and thereafter the class information 104K is stored in the memory segment 102C. The portion of the memory segment 102C that remains free is the unused portion 106C, which has a size proportional to its width relative to the width of the memory segment 102C. Thus, to store all the class information 104A, 104B, 104C, 104D, 104E, 104F, 104G, 104H, 104I, 104J, and 104K, the first classloader has had allocated to it three memory segments 102A, 102B, and 102C. However, unused portions 106A, 106B, and 106C of the memory segments 102A, 102B, and 102C remain, meaning that these portions of memory are wasted.

A second classloader has allocated to it a memory segment 108 having a fixed size that is also equal to the sizes of the memory segments 102A, 102B, and 102C allocated to the first classloader. Thus, the widths of the memory segments 102A, 102B, 102C, and 108 are the same. The second classloader just has to store one piece of class information 110. As a result, the portion of the memory segment 108 that remains free is the unused portion 112, which has a size proportional to its width relative to the width of the memory segment 108. Therefore, the unused portion 112 is also wasted, because no classes will be loaded by the second classloader.

The fixed size memory segment allocation scheme of the prior art, therefore, is wasteful. For classloaders that load just one or a few classes and thus store just a little class information, like the second classloader in FIG. 2, the prior art scheme can be inefficient, where the size of the memory segment allocated is much greater than the amount of memory needed to store the class information in question.

For these and other reasons, therefore, there is a need for the present invention.

SUMMARY OF THE INVENTION

The present invention relates to managing class memory, in which memory segments are allocated for a classloader to store information for classes loaded by the classloader. In a method of one embodiment of the invention, in response to the first request for a memory segment received from the classloader, a first memory segment is allocated for the classloader and that has a first size. In response to the second memory request for a memory segment received from the class loader, a second memory segment is allocated for the classloader and that has a second size greater than the first size. In response to each additional request received from the classloader, an additional memory segment is allocated that has a size greater than the size of the immediately preceding memory segment allocated.

The allocation approach of this embodiment of the invention can be summarized as a growing-size strategy. A small memory segment is initially allocated to the classloader, such as four kilobytes. Thereafter, the allocation size increases for each additional allocation request from the classloader. For instance, the allocation sizes for subsequent requests may double: eight kilobytes, sixteen kilobytes, and so on, until an upper limit, such as 128 kilobytes, is reached. This embodiment of the invention is advantageous, because it limits the amount of unused memory within the segments. A given classloader is first provided with smaller memory segments, and if it is evident that the classloader needs more memory, by requesting additional allocations, subsequent memory segments are larger.

In a method of another embodiment of the invention, in response to the first request for a memory segment received from the classloader, a first memory segment is allocated for the classloader that has a size equal to the amount of memory needed by the classloader to store information in conjunction with the first request. In response to the second request received from the classloader, a second memory segment is allocated that has a second size. In response to the third request received from the classloader, a third memory segment is allocated that has a third size greater than the second size.

The allocation approach of this embodiment of the invention can be summarized as an exact-then-growing-size strategy. The first memory segment allocated to the classloader is sized to be exactly large enough to store the class information that the classloader needs to initially store. For many classloaders, which only store class information for one class, no further memory segments will have to be allocated. For other class loaders, additional memory segments are allocated similar to the previous embodiment of the invention. That is, the second memory segment may be four kilobytes in size, the third memory segment may be eight kilobytes in size, and so on. Thus, the allocation approach of this embodiment of the invention first provides a memory segment that has the exact size needed, and thereafter allocates memory segments in accordance with the growing-size strategy of the previous embodiment of the invention.

In a method of still another embodiment of the invention, the type of classloader is first determined, for example from the class of the classloader object, and then an allocation approach to allocate memory segments for the classloader is selected and performed based on the classloader type. For instance, one allocation approach may be the fixed-size strategy of the prior art, where each memory segment allocated to the classloader is of the same size, such as 128 kilobytes. Another allocation approach may be the growing-size strategy, and a third allocation approach may be the exact-then-growing-size strategy.

The allocation approach of this embodiment of the invention can be summarized as a hybrid strategy. The fixed-size strategy of the prior art may be employed for classloaders that are considered to likely load many classes, such as default classloaders within virtual machines, like the primary system classloader and the primary classloader for each application. The exact-then-growing-size strategy may be employed for classloaders that are considered to likely load just one class. The growing-size strategy may be employed for all other classloaders.

Embodiments of the invention thus result in memory segment allocation to classloaders that is more efficient. There is less wasted memory by allocating memory segments in accordance with embodiments of the invention than by allocation memory segments in accordance with the fixed-size strategy of the prior art. That is, for each memory segment allocated, there is likely to be a smaller portion of the memory segment that is unused by the classloader in question, resulting in less wasted memory. The number of total memory segments are not so greatly increased compared to the prior art, so the additional overhead of managing memory segments is negligible.

Still other advantages, embodiments, and aspects of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION OF THE DRAWINGS

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
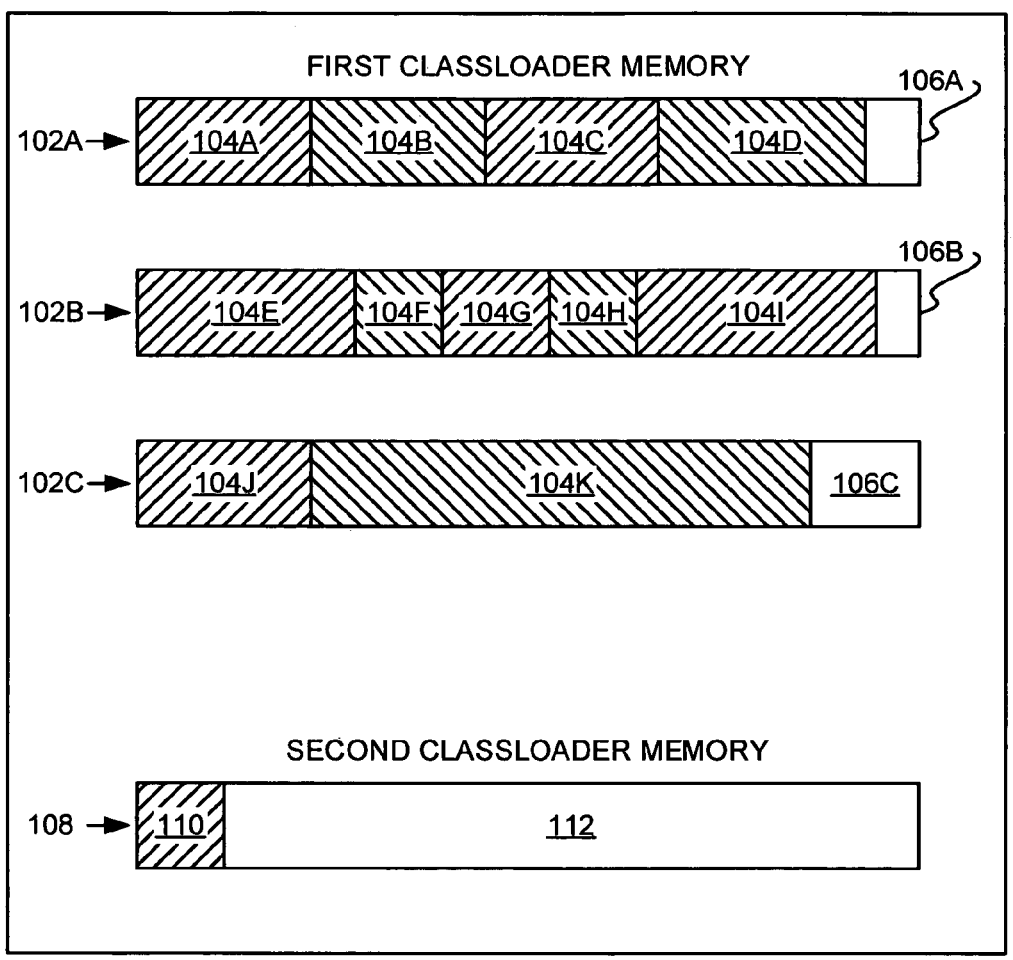
FIG. 1 is a diagram illustrating class memory segment allocation in accordance. with a fixed-size strategy of the prior art.
Figure 2:
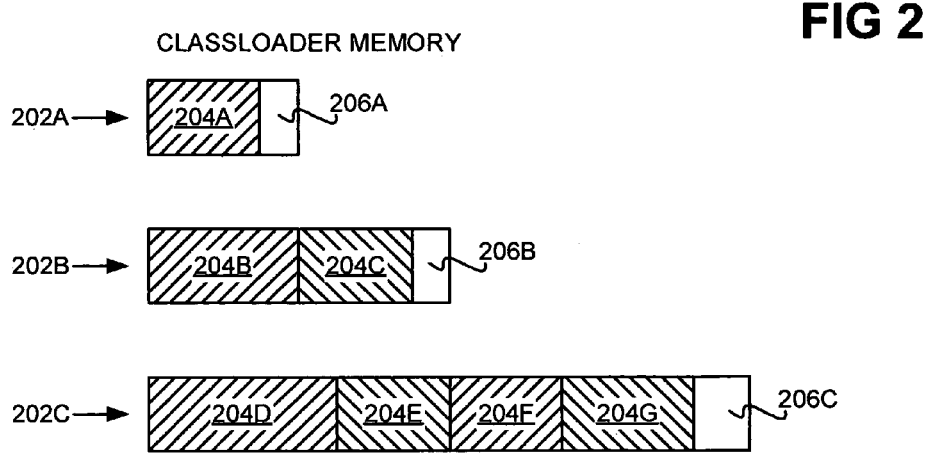
FIG. 2 is a diagram illustrating class memory segment allocation in accordance with a growing-size strategy, according to an embodiment of the invention.

FIG. 2 shows an example of class memory management in accordance with a growing-size strategy, according to an embodiment of the invention. Memory segments 202A, 202B, and 202C, collectively referred to as the memory segments 202, are ultimately allocated for a classloader to store information for the class or classes loaded by the classloader. As has been described, a classloader is software that executes as part of a virtual machine, such as a Java® virtual machine. A classloader finds a class file defining a class and that is stored on non-volatile storage like a hard disk drive, reads it into memory, and tells the virtual machine to treat the memory image of the class as legitimate bytecode. In loading a class or classes, a classloader thus needs memory to store information for the class or classes loaded.

The classloader first needs to store class information 204A. Therefore, the classloader requests a memory segment in which to store the class information 204A. In response, the memory segment 202A is allocated. The memory segment 202A has a size corresponding to its width as depicted in FIG. 2. The size of the memory segment 202A is not dependent on the size of the class information 204A stored, except, of course, that the memory segment 202A is sufficiently large to store the class information 204A. Stated another way, the size of the memory segment 202A is allocated independent of the size of the class information 204A to be stored by the classloader. In one embodiment, as the first memory segment allocated to the classloader in question, the memory segment 202A has a size of four kilobytes.

The class information 204A takes most but not all of the memory segment 202A, leaving an unused portion 206A. The amount of the memory segment 202A taken up by the class information 204A is proportional to the width of the class information 204A in FIG. 2 relative to the width of the memory segment 202A itself. Similarly, the unused portion 206A of the memory segment 202A has a size that is proportional to its width relative to the width of the memory segment 202A in FIG. 2.

The classloader then needs to store class information 204B. However, the size of the class information 204B, proportional to its width in FIG. 2, is greater than the size of the unused portion 206A of the memory segment 202A. Therefore, the classloader requests another memory segment in which to store the class information 204B. In response, the memory segment 202B is allocated. The memory segment 202B has a size corresponding to its width as depicted in FIG. 2. The size of the memory segment 202B is again allocated independent of the size of the class information 204B to be stored by the classloader. In one embodiment, as the second memory segment allocated to the classloader in question, the memory segment 202B has a size twice that of the memory segment 202A, or eight kilobytes.

The classloader then stores the class information 204B within the memory segment 202B. Thereafter, the classloader needs to store class information 204C. Because the size of the class information 204C is sufficient to fit in the remaining available portion of the memory segment 202B, the classloader stores the class information 204C within the memory segment 202B. The remaining unused portion 206B of the memory segment 202B has a size that is proportional to its width relative to the width of the memory segment 202B in FIG. 2.

The classloader next needs to store class information 204D. However, the size of the class information 204D, proportional to its width in FIG. 2, is greater than the size of the unused portion 206B of the memory segment 202B and the unused portion 206A of the memory segment 202A. Therefore, the classloader requests another memory segment in which to store the class information 204D. In response, the memory segment 202C is allocated. The memory segment 202C has a size corresponding to its width as depicted in FIG. 2. The size of the memory segment 202C is allocated independent of the size of the class information 204D to be stored by the classloader. In one embodiment, as the third memory segment allocated to the classloader in question, the memory segment 202C has a size twice that of the memory segment 202B, or sixteen kilobytes.

The classloader then stores the class information 204D within the memory segment 202C. Thereafter, the classloader stores class information 204E, 204F, and 204G all within the same memory segment 202C. What remains is the unused portion 206C of the memory segment 202C. This unused portion 206C of the memory segment 202C has a size.that is proportional to its width relative to the width of the memory segment 202C in FIG. 2.

Therefore, in general, the growing-size strategy for memory segment allocation illustrated in FIG. 2 starts by allocating a relatively small memory segment to a classloader, such as four kilobytes. Thereafter, for each additional memory segment allocated to the classloader, the memory segments double in size. Thus, the second memory segment is twice the size of the first memory segment, the third memory segment is twice the size of the second memory segment, and so on. More generally, each additional memory segment allocated is greater in size than the previously allocated memory segments. Furthermore, in one embodiment, there is an upper limit to the size of the memory segments allocated to a given classloader, such as 128 kilobytes.

Figure 3:
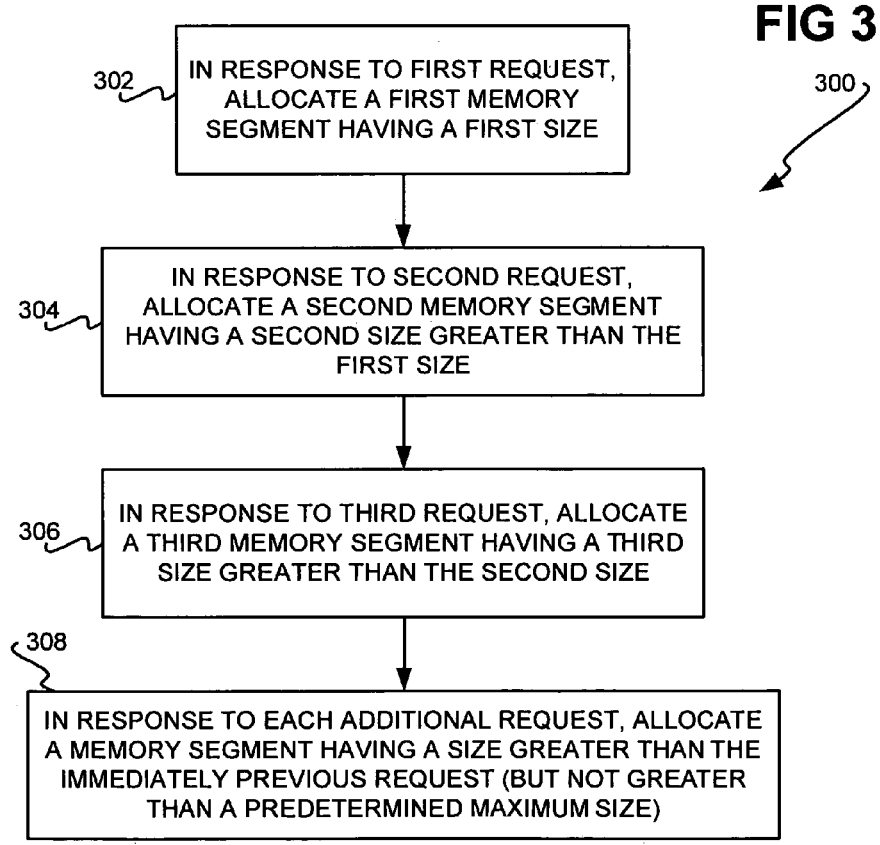
FIG. 3 is a flowchart of a method for class memory segment allocation in accordance with a growing-size strategy, according to an embodiment of the invention.

FIG. 3 shows a method 300 for class memory management in accordance with the growing-size strategy, according to an embodiment of the invention. The method 300 is performed by a memory allocation mechanism, such as within a virtual machine like a Java® virtual machine, and that is called by a classloader when needing a memory segment allocated to the classloader to store class information. In response to a first request for allocation of a memory segment by a given classloader, the method 300 allocates a first memory segment that has a first size (302). The size of this memory segment is predetermined, and is independent of the class information to be initially stored by the classloader in the segment, except that it has to be sufficiently large to store the class information. That is, the size of the memory segment is potentially greater than the amount of memory needed by the classloader to store information in conjunction with this request. In one embodiment, the first size of the first memory segment is four kilobytes.

In response to a second request for allocation of a memory segment by the classloader, the method 300 allocates a second memory segment that has a second size (304), where the second size is greater than the first size. In one embodiment, the second size is double the first size. For instance, the size of the second memory segment may be eight kilobytes. In response to a third request for allocation of a memory segment by the classloader, the method 300 allocates a third memory segment that has a third size (306), where the third size is greater than the second size. In one embodiment, the third size is double the second size. For instance, the size of the third memory segment may be sixteen kilobytes. In both 304 and 306, the size of the memory segments allocated is predetermined, and independent of the class information to be initially stored in those memory segments, except that they are sufficiently large to store the class information in question. That is, the size of the memory segments is potentially greater than the amount of memory needed by the classloader to store information in conjunction with the requests.

Thereafter, in response to each additional request for allocation of a memory segment by the classloader, the method 300 allocates a memory segment that has a size greater than the immediately previous request (308), but never greater than a predetermined maximum size. In one embodiment, the size of each additional memory segment is twice the size of the immediately previous memory segment allocated. The predetermined maximum size may be 128 kilobytes in one embodiment, such that once this size is reached, all further allocated memory segments have this same size.

Figure 4:
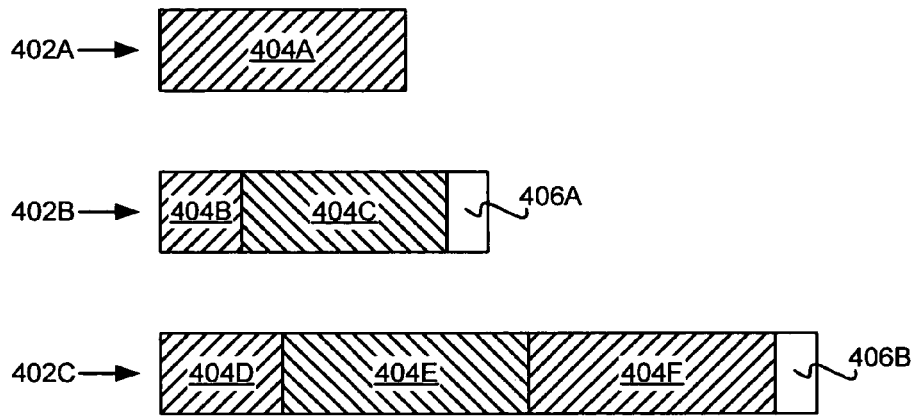
FIG. 4 is a diagram illustrating class memory segment allocation in accordance with an exact-then-growing-size strategy, according to an embodiment of the invention.

FIG. 4 shows an example of class memory management in accordance with an exact-then-growing strategy, according to an embodiment of the invention. Memory segments 402A, 402B, and 402C, collectively referred to as the memory segments 402, are ultimately allocated for a classloader to store information for the class or classes loaded by the classloader. The classloader first needs to store class information 404A. Therefore, the classloader requests a memory segment in which to store the class information 404A. In response, the memory segment 402A is allocated. The memory segment 402A has a size corresponding to its width as depicted in FIG. 4.

Furthermore, the size of the memory segment 402A is equal in size to the amount of memory needed to store the class information 404A. Thus, the size of the memory segment 402A is dependent on the size of the class information 404A to be stored in the memory segment 402A. Because the memory segment 402A is exactly sufficient in size to store the class information 404A, there is no unused portion within the memory segment 402A. That is, once the classloader stores the class information 404A within the memory segment 402A, the memory segment 402A is completely full, and no remaining unused portion within the memory segment 402A exists.

The classloader then needs to store class information 404B. Because the memory segment 402A is completely full, the classloader requests another memory segment in which to store the class information 404B. In response, the memory segment 402B is allocated. The memory segment 402B has a size corresponding to its width as depicted in FIG. 4. However, the size of the memory segment 402B is independent of the size of the class information 404B to be stored by the classloader. For instance, in one embodiment, the size of the memory segment 402B is four kilobytes in size.

The classloader then stores the class information 404B within the memory segment 402B. Thereafter, the classloader needs to store class information 404C. Because the size of the class information 404C is sufficient to fit in the remaining available portion of the memory segment 402B, the classloader stores the class information 404C within the memory segment 402B. The remaining unused portion 406A of the memory segment 402B has a size that is proportional to its width relative to the width of the memory segment 402B in FIG. 4.

The classloader next needs to store class information 404D. However, the sizeof the class information 404D, proportional to its width in FIG. 4, is greater than the size of the unused portion 406A of the memory segment 402B. Therefore, the classloader requests another memory segment in which to store the class information 404D. In response, the memory segment 402C is allocated. The memory segment 402C has a size corresponding to its width as depicted in FIG. 4. The size of the memory segment 402C is allocated independent of the size of the class information 404D to be stored by the classloader. In one embodiment, as the third memory segment allocated to the classloader in question, the memory segment 402C has a size twice that of the memory segment 402B, or eight kilobytes.

The classloader then stores the class information 404D within the memory segment 402C. Thereafter, the classloader stores class information 404E and 404F within the same memory segment 402C. What remains is the unused portion 406B of the memory segment 402C. This unused portion 406B of the memory segment 402C has a size that is proportional to its width relative to the width of the memory segment 402C in FIG. 4.

Therefore, in general, the exact-then-growing strategy for memory segment allocation illustrated in FIG. 4 starts by allocating a memory segment exactly sufficient to store the class information for which the memory segment was requested by the classloader. Thereafter, the exact-then-growing strategy is identical to the growing-size strategy that has been described. That is, the second memory segment is a relatively small memory segment, such as four kilobytes, and the third memory segment is twice the size of the second memory segment. More generally, each additional memory segment allocated is greater in size than the previously allocated memory segments. Furthermore, in one embodiment, there is an upper limit to the size of the memory segments allocated to a given classloader, such as 128 kilobytes.

Figure 5:
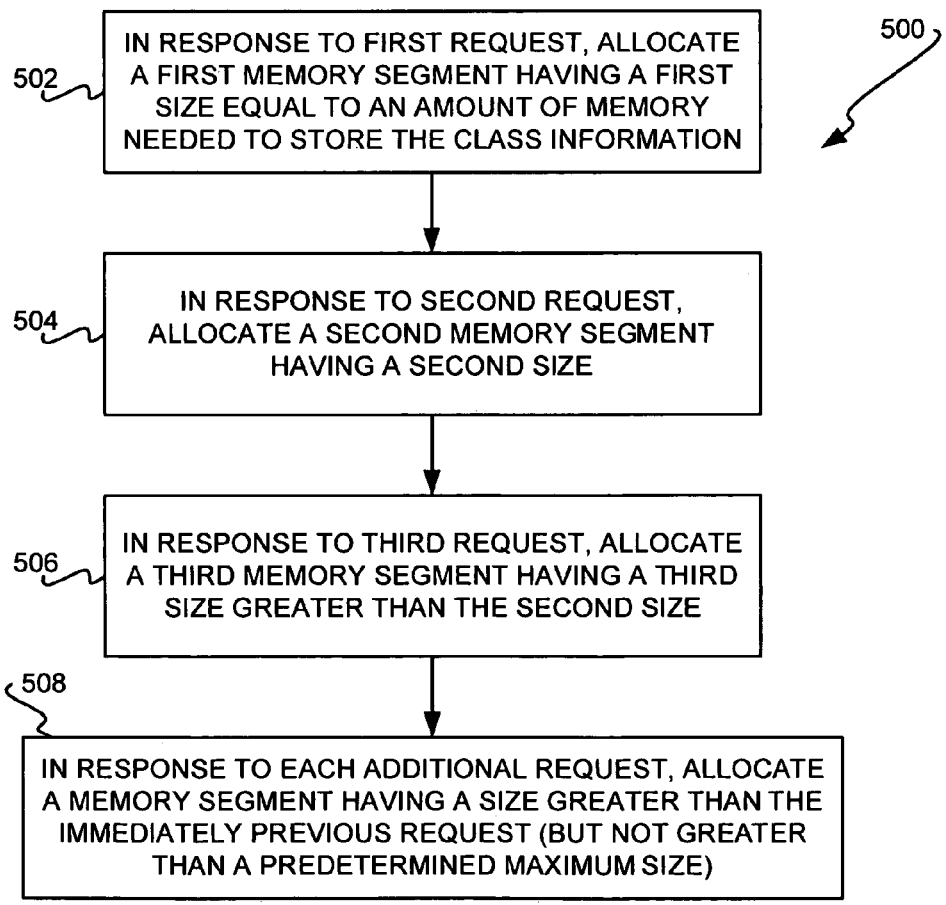
FIG. 5 is a flowchart of a method for class memory segment allocation in accordance with an exact-then-growing size strategy, according to an embodiment of the invention.

FIG. 5 shows a method 500 for class memory management in accordance with the exact-then-growing-size strategy, according to an embodiment of the invention. Like the method 300, the method 500 is performed by a memory allocation mechanism, such as within a virtual machine like a Java® virtual machine, and that is called by a classloader when needing a memory segment allocated to the classloader to store class information. In response to a first request for allocation of a memory segment by a given classloader, the method 500 allocates a first memory segment that has a first size (502). The size of this segment is equal to the amount of memory needed by the classloader to store the class information that resulted in the classloader making the first request. In other words, the size of the memory segment allocated is not a predetermined size, but is dependent on the amount of memory of the class information to be stored in the memory segment, and specifically is equal to the amount of memory of this class information.

In response to a second request for allocation of a memory segment by the classloader, the method 500 allocates a second memory segment that has a second size (504). The size of this memory segment is predetermined, and is independent of the class information to be initially stored by the classloader in the segment, except that it is sufficiently large to store the class information. That is, the size of this memory segment is potentially greater than the amount of memory needed by the classloader to store information in conjunction with this request. In one embodiment, the second size of the second memory segment is four kilobytes.

In response to a third request for allocation of a memory segment by the classloader, the method 500 allocates a third memory segment that has a third size (506), where the third size is greater than the second size. In one embodiment, the third size is double the second size. For instance, the size of the third memory segment may be eight kilobytes. As in 504, in 506 the size of the memory segment allocated is predetermined, and independent of the class information to be initially stored in the segment, except that the memory segment is sufficiently large to store the class information in question. That is, the size of the memory segment is potentially greater than the amount of memory needed by the classloader to store information in conjunction with the request.

Thereafter, in response to each additional request for allocation of a memory segment by the classloader, the method 500 allocates a memory segment that has a size greater than the immediately previous request (508), but never greater than a predetermined maximum size. In one embodiment, the size of each additional memory segment is twice the size of the immediately previously memory segment allocated. The predetermined maximum size may be 128 kilobytes in one embodiment, such that once this size is reached, all further allocated memory segments have this same size.

Figure 6:
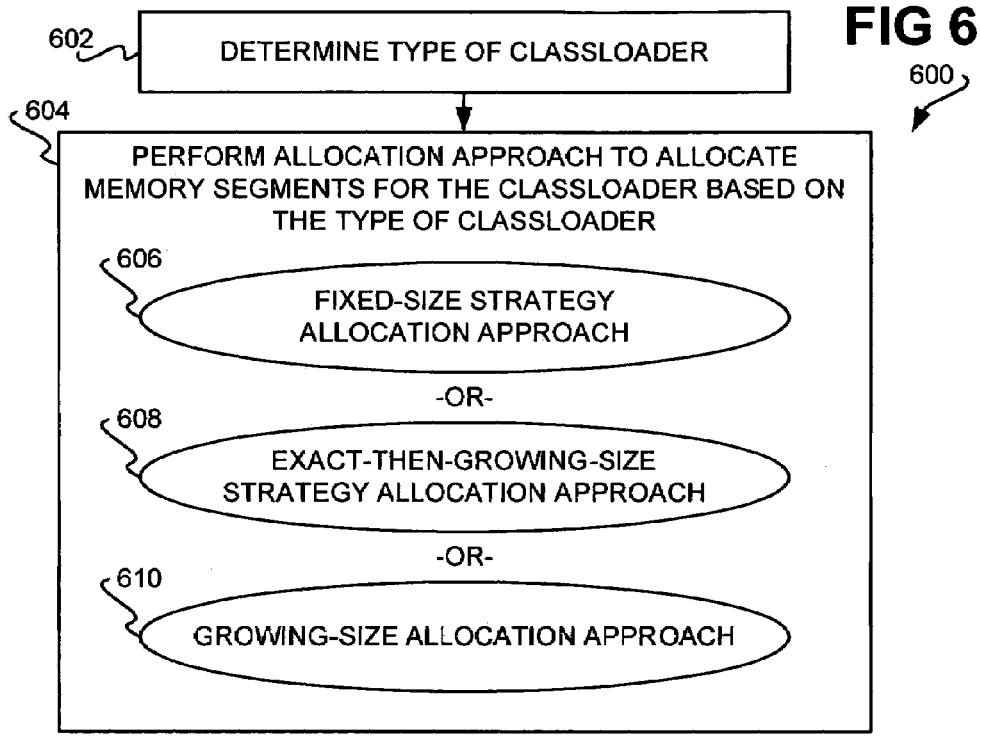
FIG. 6 is a flowchart of a method for class memory segment allocation based on the type of the classloader for which memory segments are to be allocated, according to an embodiment of the invention, and is suggested for printing on the first page of the patent.

FIG. 6 shows a method 600 for class memory management in which memory segments are allocated to a classlbader based on the type of the classloader in question, according to an embodiment of the invention. Like the other methods 300 and 500, the method 600 is performed by a memory allocation mechanism, such as within a virtual machine like a Java® virtual machine, and that is called by a classloader when needing a memory segment allocated to the classloader to store class information. First, the type of the classloader requesting a memory segment allocation is determined (602). Then, an allocation approach is performed to allocate such memory segments to the classloader based on the type of the classloader that has been determined (604).

For instance, in one embodiment, the fixed-size strategy allocation approach of the prior art is performed for classloaders that load many classes (606). That is, in response to each request received from such a classloader, a memory segment having a fixed size is always allocated to the classloader. Examples of classloaders that load many classes include default classloaders within virtual machines, like the primary system classloader and the primary classloader for each application. Furthermore, the exact-then-growing-size strategy allocation approach that has been described in relation to FIGS. 4 and 5 may be performed for classloaders that typically load just a single class (608). Finally, the growing-size strategy allocation approach that has been described in relation to FIGS. 2 and 3 may be performed for all other types of class loaders (610).

Figure 7:
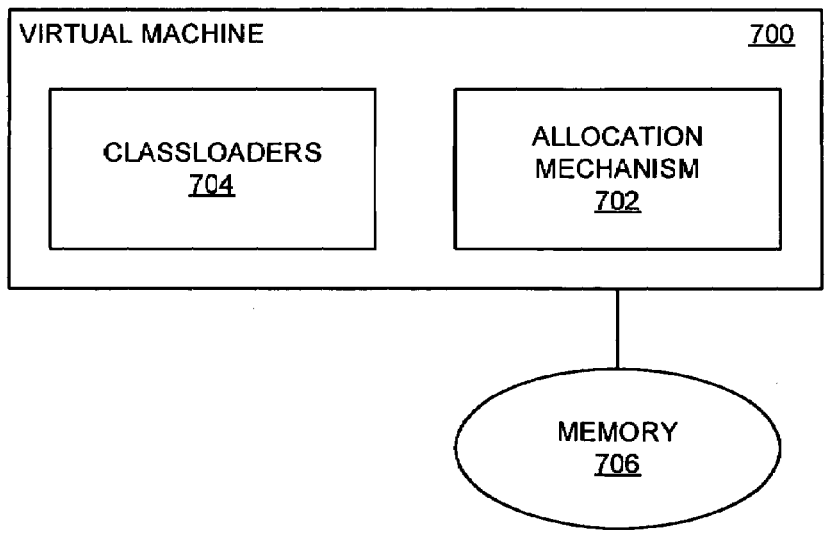
FIG. 7 is a diagram of a system in which the class memory segment allocation approaches of FIGS. 2-6 can be implemented, according to an embodiment of the invention.

FIG. 7 shows a representative computing system in conjunction with which the various allocation approaches that have been described can be implemented, according to an embodiment of the invention. There is a virtual machine 700, in relation to which classloaders 704 and an allocation mechanism 702 are executed. There is also memory 706, such as dynamic random-access memory (DRAM). The virtual machine 700 may be a Java® virtual machine, for instance, as has been described in the background section. The classloaders 704 load classes, and accordingly need segments of the memory 706 allocated to them to store the class information for these classes. Therefore, the classloaders 704 request memory segment allocations from the allocation mechanism 702. In turn, the allocation mechanism 702 allocates segments of the memory 706 to the classloaders 704 to store the class information for the classes loaded by the classloaders 704. The allocation strategy performed by the allocation mechanism 702 can be any of the allocation strategies that have been described.

It is noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. For example, the methods of different embodiments of the invention that have been described can be implemented as computer programs that are stored on computer-readable media of articles of manufacture. Such computer-readable media may be tangible computer-readable media, like recordable data storage media. Therefore, it is manifestly intended that this invention be limited only by the claims and equivalents thereof.

We claim:

1. A method for managing class memory in which memory segments are allocated for a classloader to store information for classes loaded by the classloader, comprising:
   in response to a first request received from the classloader, allocating a first memory segment having a first size;
   in response to a second request received from the classloader, allocating a second memory segment having a second size greater than the first size; and,
   in response to a third request received from the classloader, allocating a third memory segment having a third size greater than the second size.

2. The method of claim 1, further comprising, for each additional request received from the classloader, allocating an additional memory segment having a size greater than a size of a memory segment allocated in response to an immediately previously request received from the classloader.

3. The method of claim 2, wherein the size of the additional memory segment is twice the size of the memory segment allocated in response to the immediately previously request.

4. The method of claim 2, wherein the size of the additional memory segment is no greater than 128 kilobytes.

5. The method of claim 1, wherein the first size is four kilobytes, the second size is eight kilobytes, and the third size is sixteen kilobytes.

6. The method of claim 1, wherein each of the first size, the second size, and the third size is potentially greater than an amount of memory needed by the classloader to store information in conjunction with a corresponding one of the first request, the second request, and the third request.

7. The method of claim 1, wherein the method is for managing class memory in relation to a virtual machine.

8. The method of claim 7, wherein the method is for managing class memory in relation to a Java® virtual machine.

9. A method for managing class memory in which memory segments are allocated for a classloader to store information for classes loaded by the classloader, comprising:

in response to a first request received from the classloader, allocating a first memory segment having a first size equal to an amount of memory needed by the classloader to store information in conjunction with the first request;

in response to a second request received from the classloader, allocating a second memory segment having a second size; and, in response to a third request received from the classloader, allocating a third memory segment having a third size greater than the second size.

10. The method of claim 9, further comprising, for each additional request received from the classloader, allocating an additional memory segment having a size greater than a size of a memory segment allocated in response to an immediately previously request received from the classloader.

11. The method of claim 10, wherein the size of the additional memory segment is twice the size of the memory segment allocated in response to the immediately previously request.

12. The method of claim 9, wherein the second size is four kilobytes, and the third size is eight kilobytes.

13. The method of claim 9, wherein each of the second size and the third size is potentially greater than an amount of memory needed by the classloader to store information in conjunction with a corresponding one of the second request and the third request.

14. The method of claim 9, wherein the method is for managing class memory in relation to at least one of: a virtual machine, and a Java® virtual machine.

15. A method for managing class memory in which memory segments are allocated for a classloader to store information for classes loaded by the classloader, comprising:

determining a type of the classloader;

performing an allocation approach to allocate memory segments for the classloader based on the type of classloader, the allocation approach selected from a group of allocation approaches comprising:

a first allocation approach comprising:
in response to each request received from the classloader, allocating a memory segment having a fixed size;

a second allocation approach comprising:
in response to a first request received from the classloader, allocating a first memory segment having a size equal to an amount of memory needed by the classloader to store information in conjunction with the first request;
in response to a second request received from the classloader, allocating a second memory segment having a second size; and,
in response to a third request received from the classloader, allocating a third memory segment having a third size greater than the second size;

a third allocation approach comprising:
in response to the first request received from the classloader, allocating a first memory segment having a first size;
in response to the second request received from the classloader, allocating the second memory segment having the second size greater than the first size; and,
in response to the third request received from the classloader, allocating the third memory segment having the third size greater than the second size.

16. The method of claim 15, wherein the first allocation approach is employed for a type of classloader that loads many classes.

17. The method of claim 16, wherein the second allocation approach is employed for a type of classloader that loads a single class.

18. The method of claim 17, wherein the third allocation approach is employed for all other types of classloaders.

19. The method of claim 15, wherein each of the first size, the second size, and the third size is potentially greater than an amount of memory needed by the classloader to store information in conjunction with a corresponding one of the first request, the second request, and the third request.

20. The method of claim 15, wherein the type of classloader is determined by the class of the classloader object.

* * * * *